United States Patent [19]

Reiss et al.

[11] Patent Number: 5,656,066
[45] Date of Patent: Aug. 12, 1997

[54] ADSORPTIVE OXYGEN ENRICHMENT OF AIR WITH MIXTURES OF MOLECULAR SIEVE ZEOLITES

[75] Inventors: Gerhard Reiss, Leverkusen; Lothar Puppe, Burscheid; Bruno Hees, Langenfeld, all of Germany

[73] Assignee: Bayer Aktiengesellschaft, Leverkusen, Germany

[21] Appl. No.: 648,524

[22] Filed: May 13, 1996

[30] Foreign Application Priority Data

May 19, 1995 [DE] Germany .................. 195 18 407.6

[51] Int. Cl.⁶ .................................................. B01D 53/047
[52] U.S. Cl. ................... 95/96; 95/101; 95/102; 95/130; 95/902
[58] Field of Search ............. 95/101–103, 105, 95/130, 902, 96–100, 104

[56] References Cited

U.S. PATENT DOCUMENTS

| | | | |
|---|---|---|---|
| 3,237,377 | 3/1966 | Skarstrom | 95/130 X |
| 3,313,091 | 4/1967 | Berlin | 55/58 |
| 4,056,370 | 11/1977 | Heinz et al. | 95/130 |
| 4,477,267 | 10/1984 | Reiss | 55/68 |
| 4,481,018 | 11/1984 | Coe et al. | 55/68 |
| 4,557,736 | 12/1985 | Sircar et al. | 95/130 X |
| 4,950,312 | 8/1990 | Puppe et al. | 95/130 |
| 5,114,440 | 5/1992 | Reiss | 55/25 |
| 5,152,813 | 10/1992 | Coe et al. | 95/103 |
| 5,266,102 | 11/1993 | Gaffney et al. | 95/103 |
| 5,268,023 | 12/1993 | Kirner | 95/103 |
| 5,328,503 | 7/1994 | Kumar et al. | 95/101 |
| 5,411,578 | 5/1995 | Watson | 95/101 |
| 5,454,857 | 10/1995 | Chao | 95/130 X |
| 5,529,610 | 6/1996 | Watson et al. | 95/101 X |

FOREIGN PATENT DOCUMENTS

| | | |
|---|---|---|
| 0078966 | 5/1983 | European Pat. Off. |
| 0128545 | 12/1984 | European Pat. Off. |
| 0170026 | 2/1986 | European Pat. Off. |
| 0374631 | 6/1990 | European Pat. Off. |
| 60-127202 | 7/1985 | Japan .................. 95/130 |
| 60-231402 | 11/1985 | Japan .................. 95/130 |
| 1-138106 | 5/1989 | Japan .................. 95/130 |
| 1380764 | 3/1988 | U.S.S.R. .............. 95/105 |

OTHER PUBLICATIONS

Database WPI, Derwent Week 9248, an 92–394421, abstract of JP 04–293,513 (1992).
Database WPI, Derwent Week 8732, an 87–224219, absrtact of JP 62–148, 304 (19820).
Gas Review Nippon, No. 5, pp. 3(1985).
R.M. Thorogood, Gas Separation & Purification, vol. 5, pp. 83–94 (1991).

*Primary Examiner*—Robert Spitzer
*Attorney, Agent, or Firm*—Sprung Horn Kramer & Woods

[57] ABSTRACT

An improved process for the oxygen enrichment of air by vacuum swing adsorption, pressure swing adsorption or a combination thereof, wherein the improvement comprises providing at least one packing at each of the air inlet to and air outlet from the adsorber, the packing at the air inlet side of the adsorber comprising Na-Ca zeolite X with an $SiO_2/Al_2O_3$ ratio of 2.0 to 2.5 and with a $CaO/Al_2O_3$ ratio of 0.4 to 0.75, the ratio being dependent upon the air inlet temperature, at an air inlet temperature of 20° to 30° C., the $CaO/Al_2O_3$ ratio of the Na-Ca zeolite X at the inlet zone being 0.4 to 0.6, at an air inlet temperature of 30° to 40° C., the $CaO/Al_2O_3$ ratio of the Ca zeolite X at the inlet zone being 0.55 to 0.65 and at an air inlet temperature of 40° to 50° C., the $CaO/Al_2O_3$ ratio of the Na-Ca zeolite X at the inlet zone being 0.6 to 0.75, the packing at the air outlet side of the adsorber comprising Na-Ca zeolite A with a $CaO/Al_2O_3$ ratio of 0.5 to 1.0 or Na-Ca zeolite X with $CaO/Al_2O_3$ ratio of 0.4 to 1.0, above the $CaO/Al_2O_3$ ratio of the Na-Ca zeolite X at the inlet side.

3 Claims, 1 Drawing Sheet

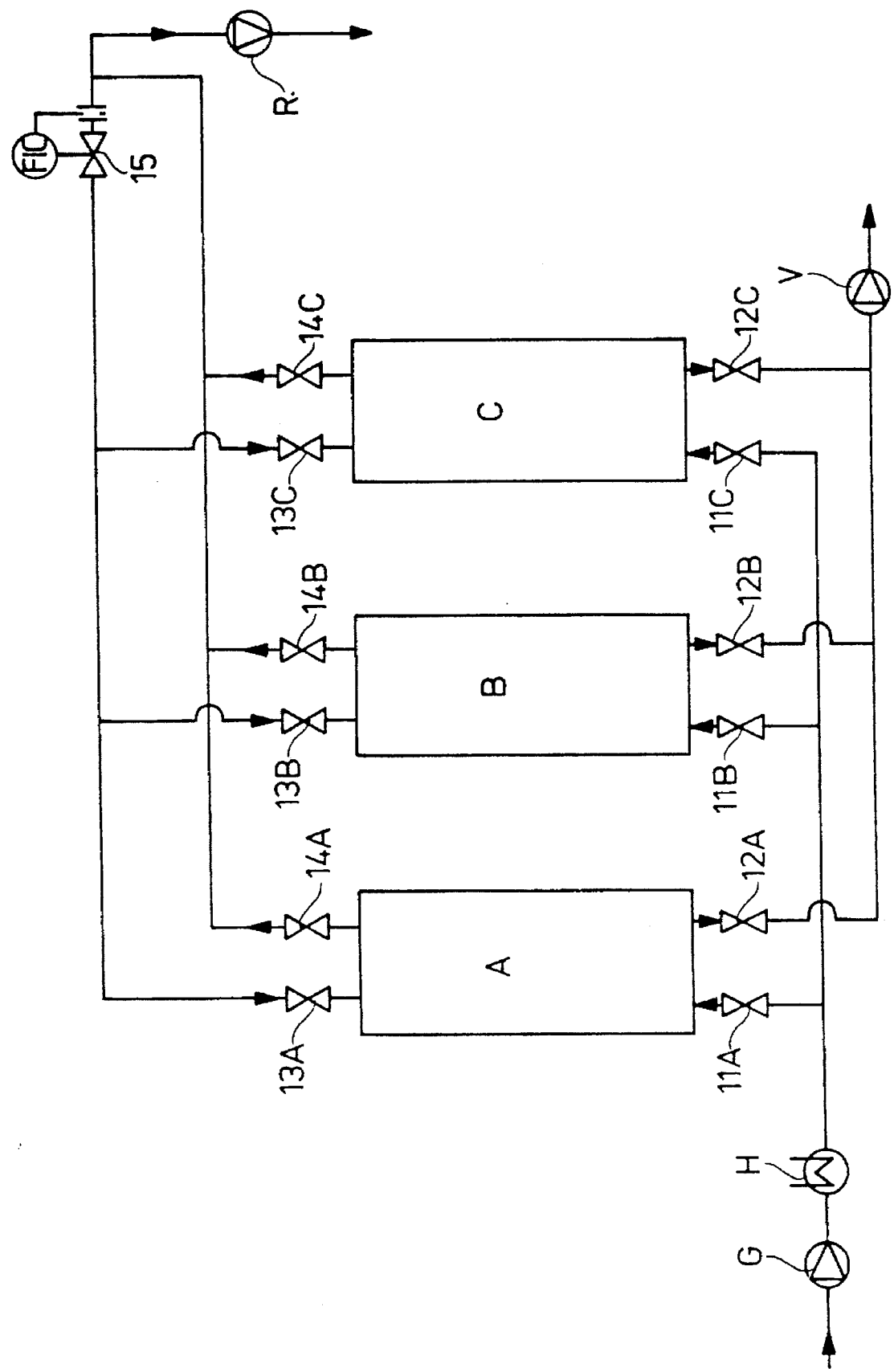

ADSORPTIVE OXYGEN ENRICHMENT OF AIR WITH MIXTURES OF MOLECULAR SIEVE ZEOLITES

The present invention relates to an improved process for the oxygen enrichment of air using vacuum swing adsorption (VSA) and/or pressure swing adsorption (PSA).

The direct production of oxygen from air at ambient temperatures is already performed on a large scale industrially with molecular sieve zeolites (c.f., for example, *Gas Review Nippon*, page 13, no. 5, 1985). Such methods exploit the preferential absorption of nitrogen in comparison with oxygen, i.e. when the air is passed through a zeolite packing, the nitrogen is adsorbed from the air and the less strongly adsorbed components, such as oxygen and argon, are collected as the product on leaving this packing. The adsorbed nitrogen may be desorbed, for example, by evacuating the packing. In this case, the process is known as vacuum swing adsorption (VSA), in contrast with the pressure swing adsorption (PSA) process, which is also known. A continuous process is achieved in the VSA process by the following processing stages: a) passage of air through zeolite packing at atmospheric pressure; $O_2$-rich gas is drawn off from the outlet side; b) evacuation of the packing with a vacuum pump down to a vacuum of approximately 100 to 300 mbar countercurrently relative to air flow; c) filling the packing with $O_2$-rich gas to 1 atm countercurrently relative to air flow (see, for example, the figure). In the PSA process, stage b) is performed at approximately 1 atm with purging with a portion of the $O_2$-rich gas. In the PVSA process, i.e. PSA with vacuum, separation is performed at transatmospheric pressure, e.g. at 1.1 to 2 bar and desorption at approximately 200 to 500 mbar (minimum pressure). The object of this process is always to achieve an elevated production rate, relative to the quantity of zeolite used, and to achieve an elevated $O_2$ yield (=ratio of the quantity of $O_2$ in the product to the quantity of $O_2$ in the introduced air).

As a consequence of the three above-stated stages, there are generally three zeolite packings, i.e. three adsorbers, which are operated cyclically.

The economic viability of such plants is influenced by capital costs, such as for example quantity of adsorbent, size of vacuum pump, and in particular by operating costs, such as the electricity consumption of the vacuum pumps. Zeolites have thus been produced with which it is possible to achieve elevated levels of nitrogen adsorption, such that the quantity of zeolite used may be reduced. Such Ca zeolites A are described in EP-A-128 545.

A highly exchanged Ca zeolite X is used in EP-A-78 966 in order to increase nitrogen adsorption performance.

A highly exchanged Ca zeolite X is also recommended in FIG. 1 of EP-A 109 063 for the oxygen enrichment of air, wherein it is stated that, as the Ca content of the zeolite X rises, $N_2/O_2$ selectivity and consequently $O_2$ yield may be increased.

JP 87/148 304 discloses an oxygen enrichment process in which an absorber with particular arrangements of various types of zeolites is used instead of an absorber with a single zeolite packing. At the air inlet side, the adsorber contains zeolites of the Na-X, Na-Y or Ca-X type and, on the air outlet side, of the Ca-Na-A type.

In Example 3 of EP-A-374 631, a CaA zeolite with low $N_2$ adsorption is used in the air inlet zone, and a CaA zeolite with elevated $N_2$ adsorption is used in the outlet zone, the $CaO/Al_2O_3$ contents of the zeolites of Example 3 being approximately equal (0.75 $CaO/Al_2O_3$). The different $N_2$ loadings stem from different levels of activation.

The object of the present invention is to provide an energy-efficient VSA-PVSA process for the oxygen enrichment of air with the assistance of an improved $O_2$ yield, i.e. an improved $N_2/O_2$ selectivity of the total packing.

It has now been found that, by means of certain combinations of specific zeolite packings, the oxygen enrichment of air may surprisingly be performed with an elevated $O_2$ yield or reduced energy consumption at air temperatures of 20° to 50° C. A Ca zeolite X having a $CaO/Al_2O_3$ ratio of 0.4 to 0.75 is used in the air inlet zone of the adsorber.

The present invention provides a process for the oxygen enrichment of air at temperatures of 20° to 50° C. by means of vacuum swing adsorption (VSA) or pressure swing adsorption (PSA) or by means of a combination of VSA and PSA, in which the air is passed through an adsorber which is filled with packings of zeolite pellets, which process is characterized in that at least two packings are present in the adsorber, wherein the packing at the air inlet side of the adsorber consists of Na-Ca zeolite X with an $SiO_2/Al_2O_3$ ratio of 2.0 to 2.5 and with a $CaO/Al_2O_3$ ratio of 0.4 to 0.75, which ratio is adapted to the air inlet temperature, and the packing at the air outlet side of the adsorber consists of Na-Ca zeolite A with a $CaO/Al_2O_3$ ratio of 0.5 to 1.0 or of Na-Ca zeolite X with a $CaO/Al_2O_3$ ratio which is above the $CaO/Al_2O_3$ ratio of the Na-Ca zeolite X at the inlet side and is 0.5 to 1.0. At an air inlet temperature of 20° to 30° C., the $CaO/Al_2O_3$ ratio of the Na-Ca zeolite X in the inlet zone is 0.4 to 0.6, at an air inlet temperature of 30° to 40° C. it is 0.55 to 0.65 and at an air inlet temperature of 40° to 50° C. it is 0.6 to 0.75.

The packing at the air inlet side of the adsorber is preferably present in a quantity of 25 to 75 wt. %, particularly preferably of 25 to 50 wt. %, relative to the total quantity of packings.

The higher is the temperature of the air at the air inlet side of the adsorber, the higher is the proportion of the packing at the air inlet side, in particular if it is a Na-Ca zeolite X with a $CaO/Al_2O_3$ ratio of 0.75 to 1.0.

The Na-Ca zeolites X used preferably have an $SiO_2/Al_2O_3$ ratio of 2.0 to 3.0, particularly preferably of 2.0 to 2.5.

The zeolite packings are preferably composed of one zeolite per packing. Within a packing, the zeolite may, however, be present with differing Ca contents, wherein the zeolite preferably has the higher Ca contents in the direction of the air outlet.

The process according to the invention is in principle performed in the same manner as conventional PSA or VSA processes. Such processes are described, for example, in *Gas Separation & Purification* 1991, volume 5, June, pages 89 to 90.

In addition to the above-stated Ca-exchanged zeolites A and X, in particular the highly exchanged zeolites, it is also possible to use zeolites exchanged with other cations. The calcium may thus be partially or entirely replaced by strontium or also magnesium (see also U.S. Pat. No. 3,313,091).

A layer, for example consisting of silica gel, may be used to dry the gas stream (air stream), upstream from the actual adsorption layers.

The following examples are intended to illustrate the invention in greater detail.

EXAMPLES

Production of Zeolite Beads

Sample A

Na-Ca zeolite X beads were produced in accordance with EP-A 0 170 026, Example 15, wherein treatment with $CaCl_2$ solution was performed 3 times and calcination was performed at 600° C. with dry nitrogen. Ca content was at a $CaO/Al_2O_3$ ratio of 0.96. The $SiO_2/Al_2O_3$ ratio of the zeolites was 2.35.

Sample B

Na-Ca zeolite X beads were produced in accordance with EP-A 0 170 026, Example 15, wherein treatment with $CaCl_2$ solution was performed once with a reduced exchange time and calcination was performed at 600° C. with dry nitrogen. Ca content was at a $CaO/Al_2O_3$ ratio of 0.6. The $SiO_2/Al_2O_3$ ratio of the zeolite was 2.35.

Sample C

Na-Ca zeolite A beads were produced in accordance with EP-A 0 170 026, Example 2. Calcination was performed with nitrogen at 500° to 600° C. Ca content was at a $CaO/Al_2O_3$ ratio of 0.72.

Sample D

Na-Ca zeolite X beads were produced in accordance with EP-A 0 170 026, Example 15, wherein treatment with $CaCl_2$ solution was performed once with a reduced exchange time and calcination was performed at 600° C. with dry nitrogen. Ca content was at a $CaO/Al_2O_3$ ratio of 0.72. The $SiO_2/Al_2O_3$ ratio of the zeolite was 2.35.

Sample E

Na-Ca zeolite X beads were produced in accordance with EP-A 0 170 026, Example 15, wherein treatment with $CaCl_2$ solution was performed once and calcination was performed at 600° C. with dry nitrogen. Ca content was at a $CaO/Al_2O_3$ ratio of 0.72. The $SiO_2/Al_2O_3$ ratio of the zeolite was 2.35.

Sample F

Na-Ca zeolite A beads were produced in accordance with EP-A 0 170 026, Example 2 and activated with dry air at 600° C. Ca content was at a $CaO/Al_2O_3$ ratio of 0.72.

Sample G

Na-Ca zeolite X beads were produced in accordance with EP-A 0 170 026, Example 15, wherein treatment with $CaCl_2$ solution was performed twice and calcination was performed at 600° C. with dry nitrogen. Ca content was at a $CaO/Al_2O_3$ ratio of 0.83. The $SiO_2/Al_2O_3$ ratio of the zeolite was 2.35.

The following data remained constant throughout the tests:

Internal diameter of adsorber: 1 000 mm

Adsorber height above packing: 2 200 mm

Final pressure on evacuation: 200 mbar 120 kg of medium pore size silica gel at air inlet end of adsorber; on top, 1 400 liters of zeolite beads, grain size 2 to 3 mm, per adsorber.

A schematic diagram of the plant in which oxygen enrichment was performed is shown in the drawing.

Referring now more specifically to the drawing, ambient air is introduced into adsorber A (at 1 bar (abs), relative humidity 75%) by means of fan G, heater H and valve 11A. Oxygen-rich gas is drawn off as the product by means of valve 14A and fan R (at 1 bar (abs)). Air separation time is 1 minute; valves 12A, 13A are closed. The temperature of the incoming air may be adjusted by means of heater H.

Simultaneously, adsorber B is evacuated to 200 mbar by means of valve 12B and vacuum pump V, wherein valves 11B, 13B, 14B of adsorber B are closed.

Simultaneously, the pressure in adsorber C is raised within one minute from 200 mbar to 1 bar (abs) with oxygen-rich gas (product) by means of valve 15 and valve 13C, while valves 11C, 12C, 14C are closed.

The suction power of the vacuum pump V and thus the final vacuum pressure may be varied.

The tests were assessed by measuring the produced quantity of gas at an $O_2$ volume concentration of 90% and the quantity of air introduced by means of fan G. The quality parameters for the process are the quantity of oxygen-rich air produced and the oxygen yield (=quantity of $O_2$ in product to quantity of $O_2$ in the incoming air).

Example 1 (Comparison)

Sample A was introduced into the adsorber. The residual $H_2O$ loading of the activated zeolite was below 0.5 wt. % (to DIN 8948; $P_2O_5$ method). The quantity of zeolite per adsorber was 905 kg. Oxygen enrichment proceeded in accordance with the above explanations. The following results were obtained:

| Inlet air temperature [°C.] | 30 | 40 |
| Quantity of product [Nm³/h] | 44 | 46.5 |
| $O_2$ yield [%] | 37 | 43 |

Example 2 (Comparison)

Sample B was introduced in the adsorber (905 kg/adsorber). The residual $H_2O$ loading of the activated zeolite was below 0.5 wt. %. The following results were obtained:

TABLE 1

| Adsorption characteristics of samples A/B/C/D/E/F/G | | | | | | | |
| --- | --- | --- | --- | --- | --- | --- | --- |
| | Sample A | Sample B | Sample C | Sample D | Sample E | Sample F | Sample G |
| Zeolite | NaCa-X | NaCa-X | NaCa-A | NaCa-X | NaCa-X | NaCa-A | NaCa-X |
| $CaO/Al_2O_3$ | 0.96 | 0.6 | 0.72 | 0.43 | 0.72 | 0.72 | 0.83 |
| Nitrogen adsorption at 1 atm, 25° C. in Nl/kg | 18 | 12 | 14 | 11 | 12 | 8 | 15.5 |
| Oxygen adsorption at 1 atm, 25° C. in Nl/kg | 5.8 | 4.3 | 4.8 | 4.3 | 4.5 | 2.9 | 5.1 |
| $N_2/O_2$ ratio at 1 atm, 25° C. | 3.10 | 2.79 | 2.92 | 2.55 | 2.67 | 2.76 | 3.04 |

| Inlet air temperature [°C.] | 30 | 40 |
|---|---|---|
| Quantity of product [Nm³/h] | 48 | 45 |
| O₂ yield [%] | 43 | 40 |

Example 3 (Comparison)

Sample C was introduced in the adsorber (905 kg/adsorber). The residual $H_2O$ loading of the activated zeolite was below 0.5 wt. %. The following results were obtained:

| Inlet air temperature [°C.] | 20 | 30 | 40 | 50 |
|---|---|---|---|---|
| Quantity of product [Nm³/h] | 48 | 48 | 49.5 | 49 |
| O₂ yield [%] | 39 | 43 | 46 | 46 |

Example 4 (Comparison)

Above the zone with the desiccant, 450 kg of sample A were introduced into the adsorber and, on top of that, 455 kg of sample C. The following results were obtained:

| Inlet air temperature [°C.] | 20 | 30 | 40 | 50 |
|---|---|---|---|---|
| Quantity of product [Nm³/h] | 42 | 41 | 44.2 | 43.5 |
| O₂ yield [%] | 37 | 40 | 42 | 44.5 |

Example 5 (According to the Invention)

Above the desiccant zone, 450 kg of sample B were introduced into the adsorber and, on top of that, 455 kg of sample A.

| Inlet air temperature [°C.] | 30 | 40 |
|---|---|---|
| Quantity of product [Nm³/h] | 49 | 50 |
| O₂ yield [%] | 46 | 49 |

Example 6 (According to the Invention)

Above the desiccant zone, 450 kg of sample B were introduced into the adsorber and, on top of that, 455 kg of sample C.

| Inlet air temperature [°C.] | 20 | 30 | 40 | 50 |
|---|---|---|---|---|
| Quantity of product [Nm³/h] | 51 | 52 | 52.5 | 50 |
| O₂ yield [%] | 40.5 | 47 | 50 | 47 |

Example 7 (According to the Invention)

Above the desiccant zone, 450 kg of sample D were introduced into the adsorber and, on top of that, 455 kg of sample C.

| Inlet air temperature [°C.] | 20 | 30 | 40 |
|---|---|---|---|
| Quantity of product [Nm³/h] | 48 | 46 | 46.9 |
| O₂ yield [%] | 43 | 44 | 45.5 |

Example 8 (According to the Invention)

Above the desiccant zone, 450 kg of sample E were introduced into the adsorber and, on top of that, 455 kg of sample C.

| Inlet air temperature [°C.] | 30 | 40 | 50 |
|---|---|---|---|
| Quantity of product [Nm³/h] | 45.3 | 46.5 | 48 |
| O₂ yield [%] | 43 | 45.5 | 49 |

Example 9 (Comparison, According to EP-A 0 374 631, Example 3)

Above the zone with the desiccant, 450 kg of sample F were introduced into the adsorber and, on top of that, 455 kg of sample C. The following results were obtained:

| Inlet air temperature [°C.] | 30 | 40 |
|---|---|---|
| Quantity of product [Nm³/h] | 48 | 49.5 |
| O₂ yield [%] | 44.05 | 47.5 |

Example 10 (Comparison)

Above the zone with the desiccant, 450 kg of sample G were introduced into the adsorber and, on top of that, 455 kg of sample A. The following results were obtained:

| Inlet air temperature [°C.] | 30 | 40 |
|---|---|---|
| Quantity of product [Nm³/h] | 44 | 47 |
| O₂ yield [%] | 37 | 42.5 |

It was found that, with an adsorption bed consisting of two packings, yield is improved in comparison with an adsorption bed consisting in each case of only one individual packing.

According to Table 1 ($N_2/O_2$ ratio), sample A with the elevated Ca content of 0.96 ought to have exhibited better $O_2$ enrichment characteristics than sample B with the moderate Ca content of 0.6. However, contrary to expectation, sample B (Example 2) has a higher yield than sample A (Example 1) over the investigated temperature range of 30° to 40° C.

Within the investigated temperature range of 30° to 40° C., the Ca zeolite A (sample C) has better properties than sample B. It was thus surprising that still better results were achieved with the combination of samples B and C than with the packing consisting of sample C.

Example 10 shows in comparison with Example 3 that, while an arrangement of two Ca zeolite A packings does indeed bring about an improvement in yield, this improvement is only approximately 1% (abs.) and is thus far less than the advantageous provision of a zone of a Ca zeolite X at the adsorber inlet. Moreover, it is not possible to produce Ca zeolite A mixtures in such a manner that optimum adaptation to air temperature is achieved. While a large difference in $N_2$ loadings is required in Ca zeolite A mixtures, it is not the $N_2$ loading in Ca zeolite X which is of decisive importance, but instead the Ca content. The Ca content of the Ca zeolite X apparently influences $N_2/O_2$ selectivity. While the $N_2$ loading of the individual component isotherms does indeed increase with the Ca content, it is only slightly perceptible in the dynamic air separation process.

Example 4 shows that use of the Ca zeolite X with a very high CaO content (sample A; 0.96 CaO) in the area of the inlet zone at conventional inlet temperatures of 20° to 50° C. provides yields which are no better than the pure Ca zeolite A (Example 3).

The comparison of Examples 6, 7 and 8 shows that, over a temperature range from 20° to 50° C., the Ca content of the Ca zeolite X in the inlet zone must, as a function of inlet temperature, should be between 0.4 and 0.75. A Ca content which is too high or too low reduces yield.

Table 2 shows that, for example in the range from 30° to 40° C., the $CaO/Al_2O_3$ should be approximately 0.6 in the Ca zeolite X in the inlet zone. The yields of this arrangement (Example 6) are substantially higher than the expected arithmetic mean of the arrangements from Example 7 (0.43 $CaO/Al_2O_3$) and Example 8 (0.72 $CaO/Al_2O_3$).

TABLE 2

| | CaX zeolite | $O_2$ yield 30° C. | $O_2$ yield 40° C. |
|---|---|---|---|
| Example 7 | 0.43 $CaO/Al_2O_3$ | 44 | 45.5 |
| Example 6 | 0.60 $CaO/Al_2O_3$ | 46 | 49 |
| Example 8 | 0.72 $CaO/Al_2O_3$ | 43 | 45.5 |
| Calculated arithmetic mean of Example 7 and 8) | 0.6 $CaO/Al_2O_3$ | 43.41 | 45.5 |

Not every CaX zeolite provides an improvement in the combination of a CaX zeolite in the inlet zone and a CaA zeolite in the outlet zone. It is also surprising that a CaX zeolite, which as an individual packing is poorer in terms of yield than a Ca zeolite A in an individual packing, provides better yields in combination with this Ca zeolite A (comparison of Examples 2 and 3 with Example 6).

At an air temperature of 20° C., Example 7 according to the invention with a Ca zeolite X in the inlet zone with a $CaO/Al_2O_3$ ratio of 0.43 exhibits better yields than Example 6 with a Ca zeolite X with a $CaO/Al_2O_3$ value of 0.6, together with better characteristics than Example 3 (packing consisting solely of CaA zeoliie).

Example 4 shows that Ca zeolite X with an elevated degree of Ca exchange of 0.96 cannot be used in the inlet zone for temperatures of 20° to 50° C. and, at 20° to 50° C., is poorer than a Ca zeolite X with a lower CaO content.

At an air temperature of 50° C., Example 8 according to the invention with a Ca zeolite X with a $CaO/Al_2O_3$ value of 0.72 in the inlet zone exhibits better yields than the combination with Ca zeolite X with a $CaO/Al_2O_3$ value of 0.96, together with better characteristics than the packing in Example 3 (consisting solely of CaA zeolite).

Example 5 shows that, within an incoming air temperature range of 30° to 40° C., a packing of exchanged Ca zeolite X (sample B) in the inlet zone and a highly exchanged Ca zeolite X in the outlet zone (sample A) provides better $O_2$ yields than the corresponding individual packings (Examples 2 and 1).

Example 10 shows that, over the investigated temperature range, a Ca zeolite X arrangement with $CaO/Al_2O_3$ ratios of above 80% brings about no substantial improvements, i.e. yield cannot be improved by a highly exchanged Ca zeolite X at the outlet.

It will be understood that the specification and examples are illustrative but not limitative of the present invention and that other embodiments within the spirit and scope of the invention will suggest themselves to those skilled in the art.

We claim:

1. In the oxygen enrichment of air at a temperature of 20° to 50° C. by means of vacuum swing adsorption (VSA) or pressure swing adsorption (PSA) or by means of a combination of VSA and PSA, wherein the air is passed through an adsorber which is filled with packings of zeolite pellets, the improvement which comprises providing at least one packing at each of the air inlet to and air outlet from the adsorber, the packing at the air inlet side of the adsorber comprising Na-Ca zeolite X with an $SiO_2/Al_2O_3$ ratio of 2.0 to 2.5 and with a $CaO/Al_2O_3$ ratio of 0.4 to 0.75, the ratio being dependent upon the air inlet temperature, at an air inlet temperature of 20° to 30° C. the $CaO/Al_2O_3$ ratio of the Na-Ca zeolites X at the inlet zone being 0.4 to 0.6, at an air inlet temperature of 30° to 40° C. the $CaO/Al_2O_3$ ratio of the Ca zeolite X at the inlet zone being 0.55 to 0.65 and at an air inlet temperature of 40° to 50° C. the $CaO/Al_2O_3$ ratio of the Na-Ca zeolites X at the inlet zone being 0.6 to 0.75, the packing at the air outlet side of the adsorber comprising Na-Ca zeolite A with a $CaO/Al_2O_3$ ratio of 0.5 to 1.0 or Na-Ca zeolite X with a $CaO/Al_2O_3$ ratio of 0.5 to 1.0, above the $CaO/Al_2O_3$ ratio of the Na-Ca zeolite X at the inlet side.

2. A process according to claim 1, wherein the packing in the air inlet zone of the adsorber is present in about 25 to 75 wt. % of the total zeolite packing.

3. A process according to claim 1, wherein the packing in the air inlet zone of the adsorber is present in about 25 to 50 wt. % of the total zeolite packing.

* * * * *